Oct. 9, 1928.
G. L. CRAGG
1,686,600
COMBINED LIGHTING AND SIGNALING MECHANISM FOR AUTOMOTIVE VEHICLES
Filed May 6, 1927
2 Sheets-Sheet 1
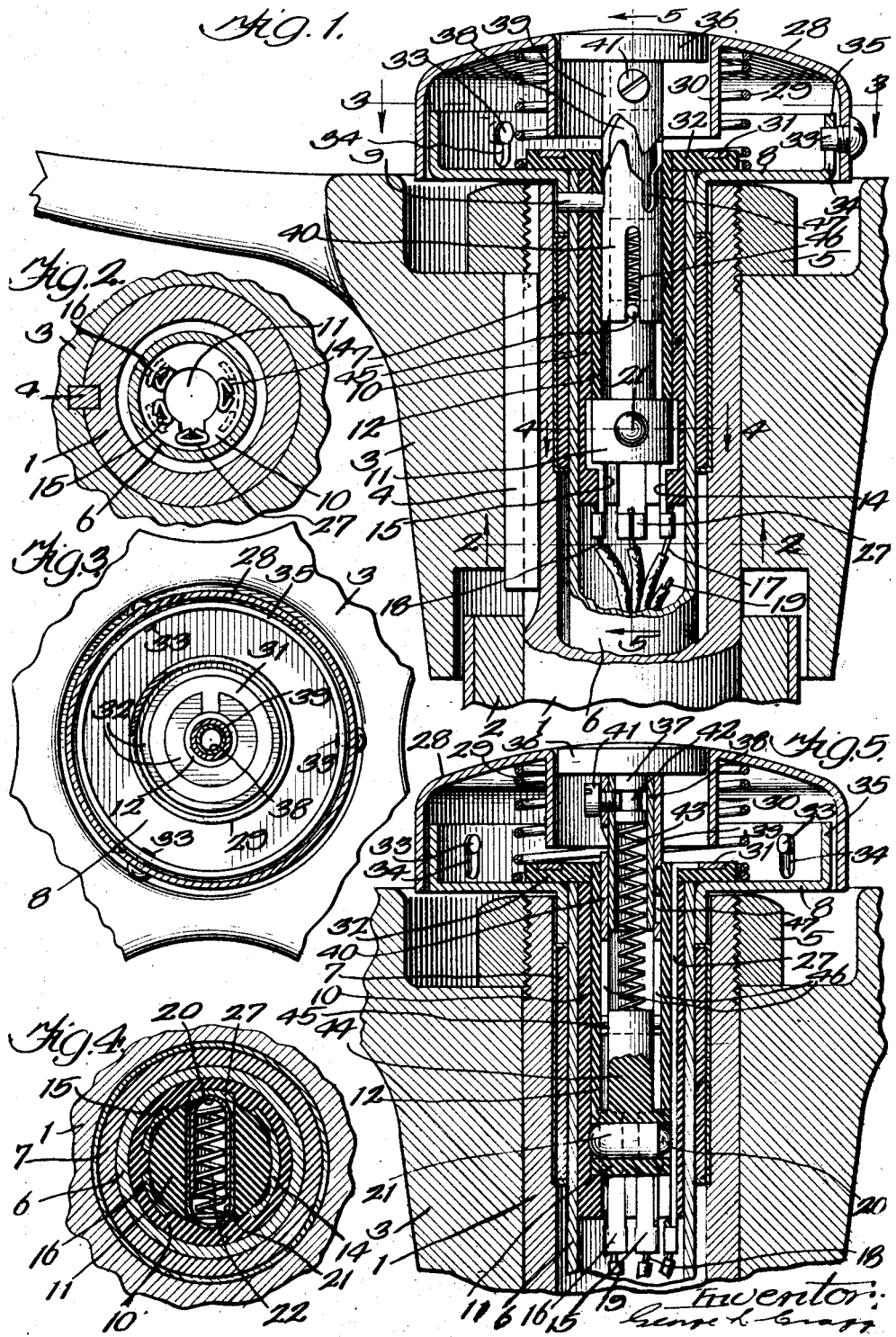

Oct. 9, 1928.
G. L. CRAGG
1,686,600
COMBINED LIGHTING AND SIGNALING MECHANISM FOR AUTOMOTIVE VEHICLES
Filed May 6, 1927    2 Sheets-Sheet 2
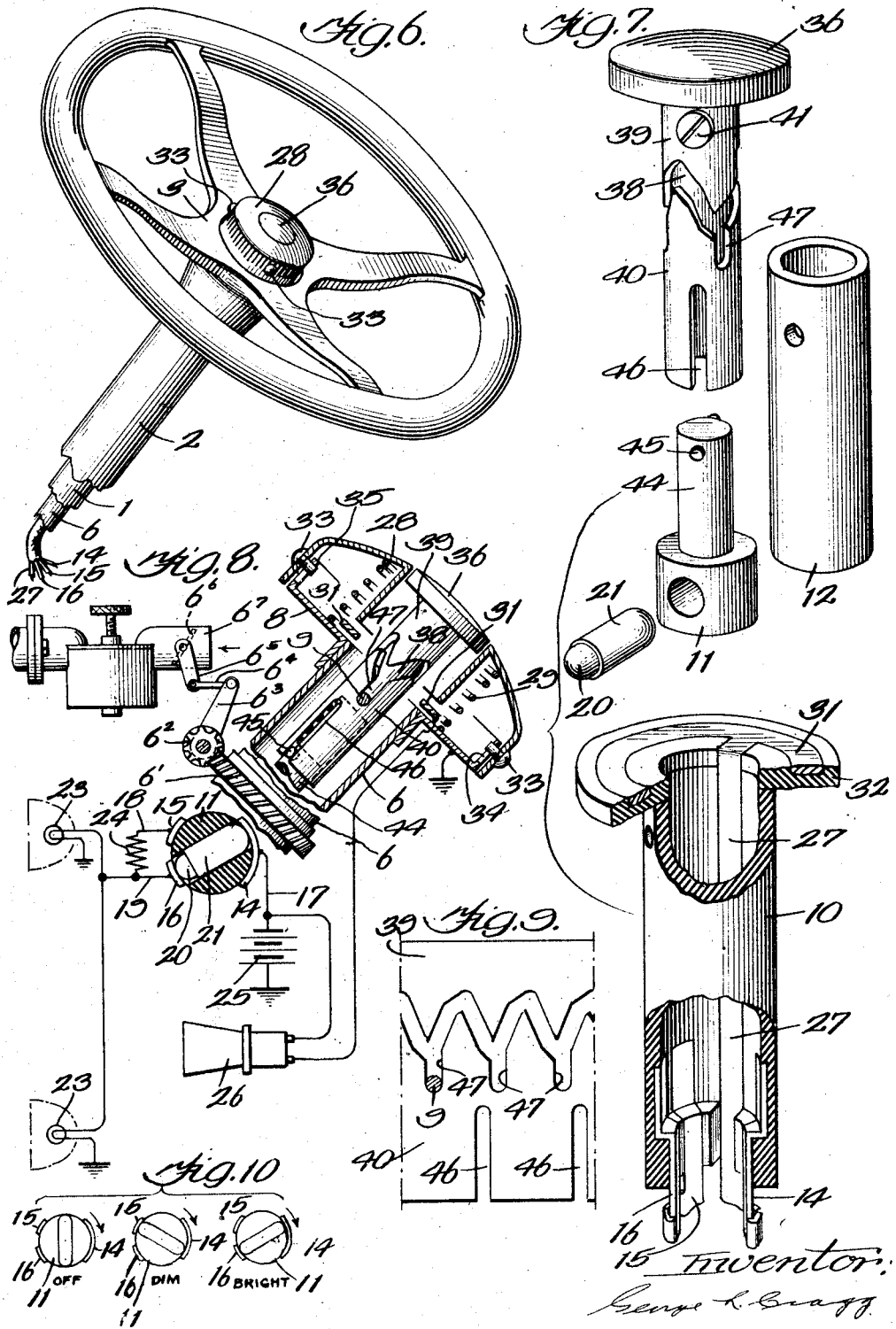

Patented Oct. 9, 1928.

1,686,600

UNITED STATES PATENT OFFICE.

GEORGE L. CRAGG, OF CHICAGO, ILLINOIS, ASSIGNOR TO HARRY A. DOUGLAS, OF BRONSON, MICHIGAN.

COMBINED LIGHTING AND SIGNALING MECHANISM FOR AUTOMOTIVE VEHICLES.

Application filed May 6, 1927. Serial No. 189,301.

My invention relates to automotive vehicles and has for one object the provision of means whereby the push button which controls a signaling circuit and which is commonly known as a horn button may also be employed as the operating element of a fuel regulator such as the valve which governs the admission of air to the carburetor.

The invention has for another object the provision of an improved construction and association of the switching mechanism which enters into the control of a lighting circuit pertaining to the vehicle.

The so-called horn button, as is well known, is disposed at the front side of a hand wheel which is coupled with the steering shaft. The button is so arranged that it may be manually moved against the force of a restoring spring toward the steering shaft and along the wheel axis to close the signaling circuit, the movement of the button being reversed, by the spring, when it is released to open the signaling circuit.

In accordance with one feature of my invention, the button is arranged to control the regulation of the fuel by being turned, the employment of an additional hand lever or handle whose sole function would be to control the fuel being thereby dispensed with. The arrangement is such that the movements of the button along the wheel axis in controlling the signaling circuit do not affect the fuel regulator and the rotary movement of the button in operating the fuel regulator does not affect the signaling circuit. In accordance with another feature of the invention, the lighting switch, which is desirably disposed within the steering shaft that is hollow, is governed by a push button which is surrounded by the signaling push button and is coaxial therewith and with the hand steering wheel, the two buttons being movable together and independently of each other along their common axis. The outer faces of these two buttons are desirably flush when they are at rest so that the lighting switch button may be readily found when it is to be used. The two buttons are permitted to move together toward the hand steering wheel when the signaling push button is struck, the lighting switch button being in lost motion relation to the switch controlled thereby so that when it is thus moved with the signaling button, it will not operate the lighting switch. When the lighting switch is to be operated, the lighting button is moved toward the hand steering wheel beyond the range of such lost motion.

My invention will be more fully explained in connection with the accompanying drawings in which Fig. 1 is a sectional view of a portion of the hand steering wheel and the mechanism of my invention in association therewith; Fig. 2 is a sectional view on line 2—2 of Fig. 1; Fig. 3 is a sectional view on line 3—3 of Fig. 1, on a smaller scale; Fig. 4 is a sectional view on line 4—4 of Fig. 1, on a larger scale; Fig. 5 is a sectional view on line 5—5 of Fig. 1; Fig. 6 is a perspective view; Fig. 7 is a view showing component parts of novel mechanism in separated relation; Fig. 8 is a diagrammatic illustration of the mechanism and circuit arrangement; Fig. 9 is a developed view of the cam structure which is used in conjunction with the lighting switch button; and Fig. 10 is a diagram illustrating the three positions which are provided for the lighting switch, in the preferred embodiment of the invention.

The steering shaft 1 is shown as being hollow. It is connected at its lower end with the steering gear of an automotive vehicle such as the steering vehicle wheels of an automobile, as is well understood. The steering shaft is mounted to turn within a stationary steering column 2 which is suitably anchored in position. A hand steering wheel 3 is coupled in fixed relation with the shaft by means of a key or feather 4, this hand steering wheel being above the steering column, the steering shaft extending upwardly beyond the steering column in order that it may be coupled with the wheel, as is understood. The upper end of the steering shaft is threaded to receive an assembling nut 5 for holding the wheel in a fixed zone with respect to the steering shaft, the hub portion of the wheel being dished out to receive said nut. In the embodiment of the invention illustrated, a hollow rod 6 passes through the bore of the steering shaft and is connected at its lower end with the air valve that governs the admission of air to the carbureter in any well known manner as that diagrammatically illustrated in Fig. 8, for example. In this figure I have shown a spur gear 6' in mesh with the spur pinion 6² which is in fixed relation to the pivoted end of an arm 6³. This arm is joined by a link 6⁴ with an arm 6⁵ which is assembled with the air valve 6⁶ which is located in the intake pipe 6⁷ of a carburetor 6⁸. As is understood, this carburetor supplies carbureted air to the internal combustion engine which is employed in the power plant of the automotive vehicle for effecting the propulsion of the vehicle. This rod 6 is journaled, at its upper end, in a bearing 7 which is received in the upper end of the steering shaft 1. A collar 8 is secured to the upper end of the rod 6 by a pin 9.

An insulating sleeve 10 is fixed in the upper end of the rod 6 and serves as a casing for a light controlling switch. A plug 11 of insulation is mounted to turn in the sleeve 10 and is confined to a fixed zone of rotation with the aid of a distance preserving sleeve 12 of insulation which overlies the plug 11 and is held in fixed relation with the insulation sleeve 10 by the aforesaid pin 9. A switch is contained within the hollow rod 6 and within the interior of the shaft 1 near the upper ends of these elements. This switch is inclusive of three arcuate contacts 14, 15 and 16 which are mounted upon and within the insulating sleeve 10 and which extend downwardly beyond this sleeve for connection with the circuit wires 17, 18 and 19 which are connected in the circuit that is illustrated in Fig. 8 and which circuit will be later more fully described. Said contacts are of step formation to support the plug 11 and cooperate with the distance preserving sleeve 12 in confining the plug 11 to a fixed zone of rotation.

The plug 11 carries two metallic contacts 20 and 21 which are in telescoping relation and which enclose a coiled spring 22 which presses the outer ends of these contacts apart and into engagement either with the contacts 14, 15 and 16, respectively, or out of such engagement, according to the position to which the plug 11 is turned. The lighting circuit is inclusive of two head lamps 23, each head lamp being connected by the conductor 19 with the contact 16 and by the conductor 18 with the contact 15, the conductor 18 including the dimming resistance 24 in series therewith. When the lighting circuit is adjusted as illustrated in Fig. 8, the head lamps glow brightly. When the plug 11 is turned to connect the contact 20 with the contact 15, the dimming resistance is included in the circuit to cause the head lamps to glow dimly. The contact 14 is engaged by the contact 21 when the contact 20 is in engagement with either of the contacts 15 or 16. When the contacts 20 and 21 are turned out of engagement with the contacts complemental thereto, the circuit is opened. It is understood that the lighting circuit is completed by way of the conductor 17 which is grounded through the battery 25. The push button mechanism for operating the lighting switch will be hereinafter described. The signaling circuit includes the sounding horn 26, the grounded battery 25, and the strip conductor 27 which is received in a channel formed in the sleeve 10. This signaling circuit is governed by a grounded metallic hollow cup-shaped push button 28 which is coaxial with the collar 8 and which may be moved along the axis of the wheel and toward the wheel when the signaling circuit is to be established, a coiled spring 29 restoring the button to its non-circuit closing position when the button is released. When the button is manually applied, the hub sleeve 30 thereof engages the annular contact 31, that is an integral continuation of conductor 27, this annular contact being carried by an insulating ring 32 which rests upon the collar 8 and surrounds the sleeve 12 and is fixed with respect thereto. The button 28, which is thus at the front side of the steering wheel 3, is reciprocable along the axis of the wheel to govern the signaling circuit. The button is coupled with the collar 8 so that when it is turned, it will turn the collar and thereby regulate the air valve 6⁶. The coupling illustrated is of a pin and slot formation, the skirt of the button carrying pins 33 which enter slots 34 formed in the skirt 35 of the collar 8. These slots extend along the axis of the steering wheel so that as the button 28 is moved along the axis of the wheel, it has no effect upon the collar 8 and the air valve coupled with this collar. When, however, the button 28 is turned, it turns the collar to adjust the air valve as desired.

It has hitherto been the practice to assemble an air valve controlling hand lever with the push button at the front side of the steering wheel. By means of my invention this especially provided air valve controlling hand lever is dispensed with.

The lighting switch is controlled by a push button 36 which is surrounded by the hub sleeve 30 that is a part of the button 28. This sleeve and the button 36 contained therein are both surrounded by the body of the button 28 and the upper faces of the two buttons which are engaged by the hand or finger are normally flush so that the two buttons together do not present a marked difference in appearance from the single horn button hitherto employed, as is evidenced by Fig. 6. Moreover, these surfaces of the two buttons being normally flush, the button 36 is readily found by the finger when it is to be depressed without depressing the button 28. As will presently appear and as generally hitherto stated, the two buttons may be moved together when the button 28 is struck to sound the horn, the extent of this coincident motion of the two buttons being limited by the pins 33 and slots 34. During this coincident motion of the two buttons, the button 36 has no effect upon the lighting switch, being then in lost motion relation to this switch. When the lighting switch is to be operated, the button 36 is pushed beyond its lost motion range. In order that the button 36 may be operated, as generally stated, I provide the mechanism which is clearly shown in Figs. 1, 5, 7, 8 and 9. This mechanism includes the hub continuation 37 of the button 36, a sleeve 38 surrounding this extension, two sleeves 39 and 40 which surround the sleeve 38 and are coupled thereby, the sleeves 39 and 40 being spaced apart longitudinally of the sleeve 38, a screw 41 whose shank is threaded into engagement with the sleeves 38 and 39 and enters a groove 42 formed in the hub extension 37 of the button 36, a coiled spring 43 within the sleeve 38, a stem continuation 44 of the plug 11, this stem entering the bore of the sleeve 40 and being pressed downwardly upon by the spring 43 which presses upwardly upon the button stem 37, and pins 45 which enter the longitudinal slots 46 in the sleeve 40, the plug 11 being turned to its different positions by turning movement imparted to the sleeves 38, 39 and 40. The two sleeves 39 and 40 are spaced apart by a cam shaped slot which receives the inner end of the pin 9. This cam shaped slot has elongated portions 47 which are parallel with the axis of the buttons so that the sleeves are not turned during the time that the pin 9 is in one of these slot portions 47, the pin 9 remaining in some one of the portions 47 during all of the movements of the button 28, and while the button 36 moves longitudinally of the wheel axis with the button 28. It is these slot portions 47 that establish the lost motion relation between the button 36 and the contact carrying plug 11 of the lighting switch. When the button 36 is moved inwardly sufficiently to remove the slot portion 47 from engagement with the pin 9 and to bring the inner end of this pin to the top of the cam groove or slot, the sleeves 38, 39 and 40 are turned whereby the switch contact carrying plug 11 is turned a half the distance necessary to effect a desired change in the lighting circuit. When the button 36 is released, the spring 43 completes the turning movement of the shaft 38 in conjunction with the interaction of the pin 9 and cam slot, said pin thereupon entering a new slot portion 47 to hold the lighting circuit in its new adjustment. Referring to Fig. 10, the lighting switch has three positions, an arrangement which is preferred. In one position the head lamps glow brightly. A complete circuit changing movement of the button 36 will open the lighting circuit. The next complete circuit changing movement of the lighting switch will adjust the light circuit to cause the head lamps to glow dimly.

Changes may be made without departing from the invention.

Having thus described my invention, I claim:

1. In an automotive vehicle propelled by an internal combustion engine, the combination with a steering shaft thereof; of a hand wheel coupled with said shaft for turning the shaft; a signaling circuit; switching means in controlling relation to the signaling circuit and inclusive of an operating push button disposed at the front side of said wheel, said button being movable along the axis of the wheel, mounted to turn, and in operating relation to said switching means when moved along the axis of the wheel; and fuel regulating means also inclusive of said button which is in operating relation thereto when turned.

2. In an automotive vehicle propelled by an internal combustion engine, the combination with a steering shaft thereof; of a hand wheel coupled with said shaft for turning the shaft; a signaling circuit; switching means in controlling relation to the signaling circuit and inclusive of an operating push button disposed at the front side of said wheel, said button being movable along the axis of the wheel, mounted to turn, and in operating relation to said switching means when moved along the axis of the wheel; fuel regulating means; and a coupling structure establishing connection between said button and fuel regulating means and operative when the button is turned and ineffective when the button is moved along the axis of the wheel.

3. In an automotive vehicle propelled by an internal combustion engine, the combination with a steering shaft thereof; of a hand wheel coupled with said shaft for turning the shaft; a signaling circuit; switching means in controlling relation to the signaling circuit and inclusive of an operating push button disposed at the front side of said wheel, said button being movable along the axis of the wheel, mounted to turn, and in operating relation to said switching means when moved along the axis of the wheel; fuel regulating means; and a pin and slot coupling structure establishing connection between said button and fuel regulating means and operative when the button is turned and ineffective when the button is moved along the axis of the wheel.

4. The combination with the steering shaft of an automotive vehicle; of a hand wheel coupled with said shaft for turning the shaft; a signaling circuit; a lighting circuit; switching means in controlling relation to the signaling circuit and inclusive of an operating push button disposed at the front side of said wheel; and switching means in controlling relation to the lighting circuit and inclusive of another button which is surrounded by the first button, and a coupling establishing lost motion relation between the second push button and the balance of the lighting circuit controlling switching means.

5. The combination with the steering shaft of an automotive vehicle; of a hand wheel coupled with said shaft for turning the shaft;

a signaling circuit; a lighting circuit; switching means on said wheel in controlling relation to the signaling circuit and inclusive of an operating push button disposed at the front side of said wheel; and switching means in controlling relation to the lighting circuit and inclusive of another push button, one of said push buttons surrounding the other.

6. The combination with the steering shaft of an automotive vehicle; of a hand wheel coupled with said shaft for turning the shaft; a signaling circuit; a lighting circuit; switching means in controlling relation to the signaling circuit and inclusive of an operating push button disposed at the front side of said wheel; switching means in controlling relation to the lighting circuit and inclusive of another button which is surrounded by the first button, and a coupling establishing lost motion relation between the second push button and the balance of the lighting circuit controlling switching means; and spring means for restoring both buttons to their outer positions, said buttons having their outer faces normally substantially flush.

7. In an automotive vehicle propelled by an internal combustion engine, the combination with a steering shaft thereof; of a hand wheel coupled with said shaft for turning the shaft; an electric circuit; switching means in controlling relation to said circuit and inclusive of an operating push button disposed at the front side of the said wheel, said button being movable along the axis of the wheel, mounted to turn, and in operating relation to said switching means when moved along the axis of the wheel; and fuel regulating means also inclusive of said button which is in operating relation thereto when turned.

8. The combination with the steering shaft of an automotive vehicle; of a hand wheel coupled with said shaft for turning the shaft; a signaling circuit; a lighting circuit; switching means in controlling relation to the signaling circuit and inclusive of an operating push button disposed at the front side of said wheel; and switching means in controlling relation to the lighting circuit and inclusive of another button, the first aforesaid button surrounding the second.

9. The combination with the steering shaft of an automotive vehicle; of a hand wheel coupled with said shaft for turning the shaft; a signaling circuit, a lighting circuit; switching means on said wheel in controlling relation to the signaling circuit and inclusive of an operating push button disposed at the front side of said wheel; switching means in controlling relation to the lighting circuit and inclusive of another push button, one of said push buttons surrounding the other; and a coupling establishing lost motion relation between the second push button and the balance of the lighting circuit-controlling switching means.

In witness whereof, I hereunto subscribe my name.

GEORGE L. CRAGG.